(12) United States Patent
Kinpara

(10) Patent No.: US 7,258,218 B2
(45) Date of Patent: Aug. 21, 2007

(54) MULTI-PLATE CLUTCH

(75) Inventor: Hiroyuki Kinpara, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 11/367,335

(22) Filed: Mar. 6, 2006

(65) Prior Publication Data
US 2006/0201772 A1 Sep. 14, 2006

(30) Foreign Application Priority Data
Mar. 8, 2005 (JP) ............................ 2005-063586

(51) Int. Cl.
*F16D 25/0638* (2006.01)
*F16D 13/52* (2006.01)
(52) U.S. Cl. ................. 192/85 AA; 192/70.2
(58) Field of Classification Search ............... 192/70.2, 192/85 AA
See application file for complete search history.

(56) References Cited
U.S. PATENT DOCUMENTS
5,439,087 A * 8/1995 Umezawa .................. 192/70.2
6,513,636 B2 * 2/2003 Han et al. ................ 192/85 AA
6,786,843 B2 * 9/2004 Mizuno ...................... 475/120

FOREIGN PATENT DOCUMENTS
JP          09-287622         11/1997

\* cited by examiner

*Primary Examiner*—Richard M. Lorence
(74) *Attorney, Agent, or Firm*—Miles & Stockbridge PC

(57) ABSTRACT

The present invention provides a multi-plate clutch comprising drive plates which are coaxially disposed within a clutch housing and to which friction materials are fixed, driven plates which are alternately arranged with the drive plates and a piston having an urging surface for providing an axial load to engage the drive plates and the driven plates with each other and wherein a plurality of urging portions protruding toward the driven plate are formed on the urging surface of the piston and the urging portions are provided in correspondence to an arrangement of spline projections provided on an outer periphery of the driven plate unequidistantly along a circumferential direction.

4 Claims, 2 Drawing Sheets

MULTI-PLATE CLUTCH

BACKGROUND OF THE INVENTION

1. Field of the Invention

The present invention relates to a multi-plate clutch used in an automatic transmission of a vehicle and the like. More particularly, the present invention relates to a multi-plate clutch in which a relative relationship between urging portions of a piston and spline positions of driven plates are regulated.

2. Related Background Art

In a multi-plate clutch, a power is transmitted by engaging a plurality of friction engaging elements disposed within a clutch housing with each other. Within the clutch housing, a piston movable in an axial direction is provided for applying an axial urging force to the friction engaging elements to engage them with each other.

In the multi-plate clutch, it is designed so that driven plates (separator plates) and drive plates (friction plates), which serve to act as the friction engaging elements, are alternately arranged in an overlapped fashion, whereby the multi-plate clutch is engaged (tightened) or disengaged (released) by engaging the friction engaging elements with each other by the urging force of the piston or disengaging the friction engaging elements from each other.

When the piston of the multi-plate clutch urges the driven plates, due to a difference in stress between pawl portions (spline portions) and non-pawl portions of the driven plates, heat spots are generated. The heat spots are black spots generated on surfaces of the driven plates (separator plates) by means of engagement with high heat load. Since the heat spot portion is convex, the heat spot may attack the friction material. Accordingly, the heat spot may cause shudder or may affect a bad influence upon the operation and endurance of the clutch.

Further, if the splines of the driven plates are not positioned equidistantly, when the piston of the multi-plate clutch urges the driven plates, since there is difference in rigidity between the spline portions and non-spline portions of the driven plates, the driven plates may be deformed, with the result that the heat spots may partially be generated on urging surfaces corresponding to the non-spline portions.

In order to suppress the heat spot, Japanese Patent Application Laid-open No. 9-287622 (1997) discloses an arrangement in which, in order to make temperatures between plates uniform, thicknesses of driven plates are reduced steppingly from the driven plate nearest to a piston.

However, as shown in the above-mentioned Japanese Patent Application Laid-open No. 9-287622, the fact that a plurality of driven plates having different thicknesses are prepared for one multi-plate clutch may lead in increase in cost, thereby causing a new problem.

SUMMARY OF THE INVENTION

Accordingly, an object of the present invention is to provide a multi-plate clutch which can suppress heat spots on driven plates and can maintain a stable operation, with a compact construction without increasing the cost.

In order to achieve the above object, the present invention provides a multi-plate clutch comprising drive plates which are coaxially disposed within a clutch housing and to which friction materials are fixed, driven plates which are alternately arranged with the drive plates and a piston having an urging surface for providing an axial load to engage the drive plates and the driven plates with each other and wherein a plurality of urging portions protruding toward the driven plate are formed on the urging surface of the piston and the urging portions are provided in correspondence to an arrangement of spline projections provided on an outer periphery of the driven plate un-equidistantly along a circumferential direction.

The present invention has the following advantage.

Heat spots on the driven plates can be suppressed and a stable operation can be maintained, with a compact construction without increasing the cost. That is to say, on the basis of a configuration of the urging surface of the piston, ability for resisting to the heat spot of the driven plate can be enhanced, and, more particularly, generation of the heat spot can be suppressed by providing convex or protruded portions on the piston in correspondence to the arrangement of the spline portions and by urging the driven plate by means of such protruded portions.

DESCRIPTION OF THE PREFERRED EMBODIMENTS

Figure 1:
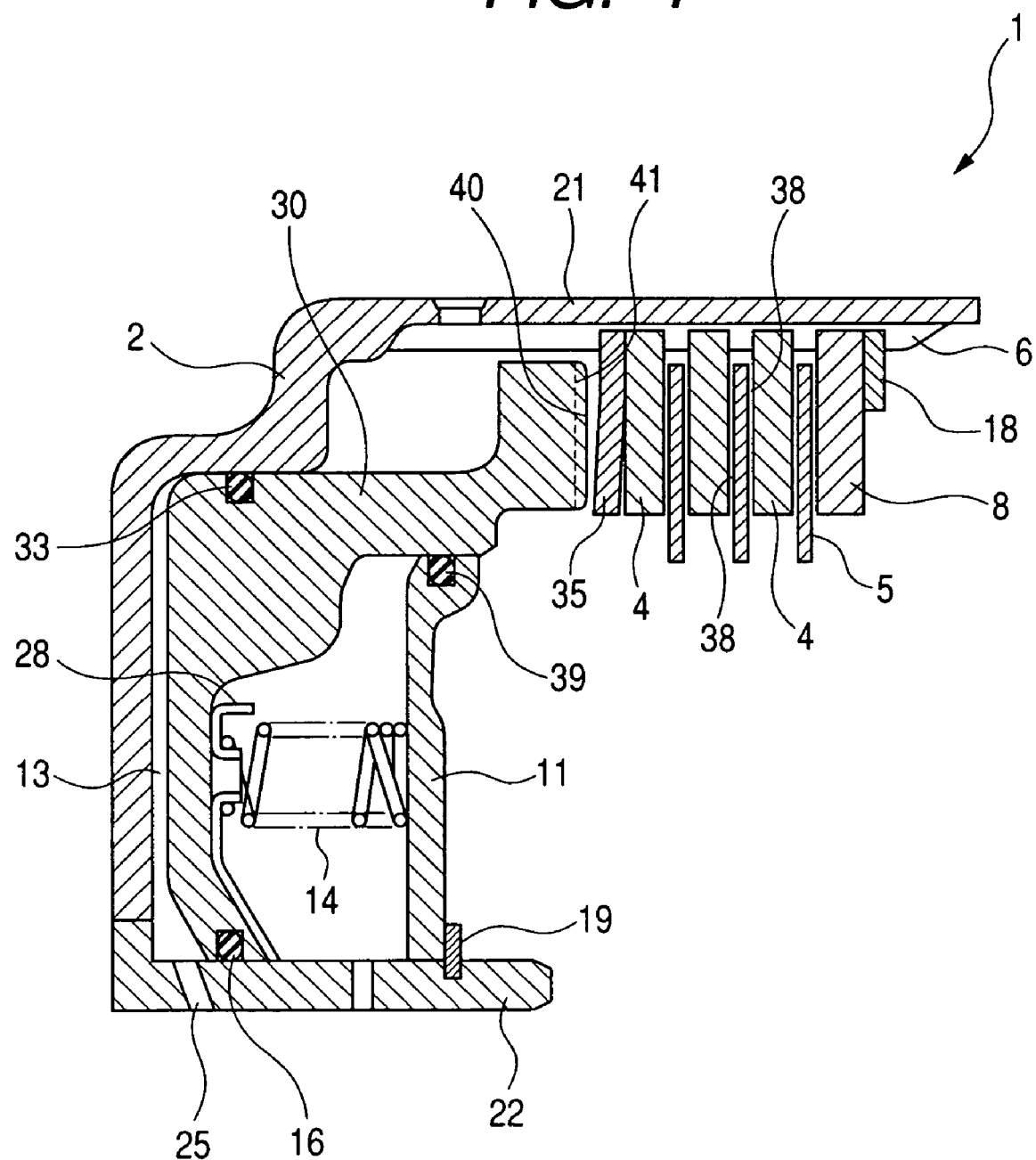
FIG. 1 is an axial sectional view showing an embodiment of a multi-plate clutch according to the present invention.

Now, embodiments of the present invention will be fully explained with reference to the accompanying drawings. Incidentally, in the drawings, the same parts or elements are designated by the same reference numerals. Further, it should be noted that the embodiments which will be described hereinbelow are merely examples of the present invention and do not limit the present invention.

Figure 2:
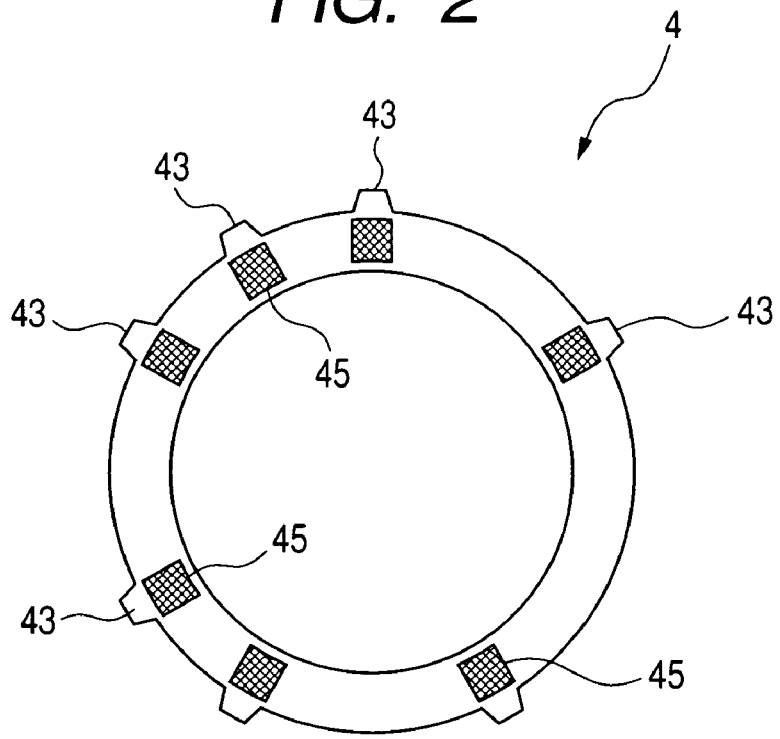
FIG. 2 is a front view of a separator plate used in the multi-plate clutch of the present invention, showing urged areas urged by a piston.
Figure 3:
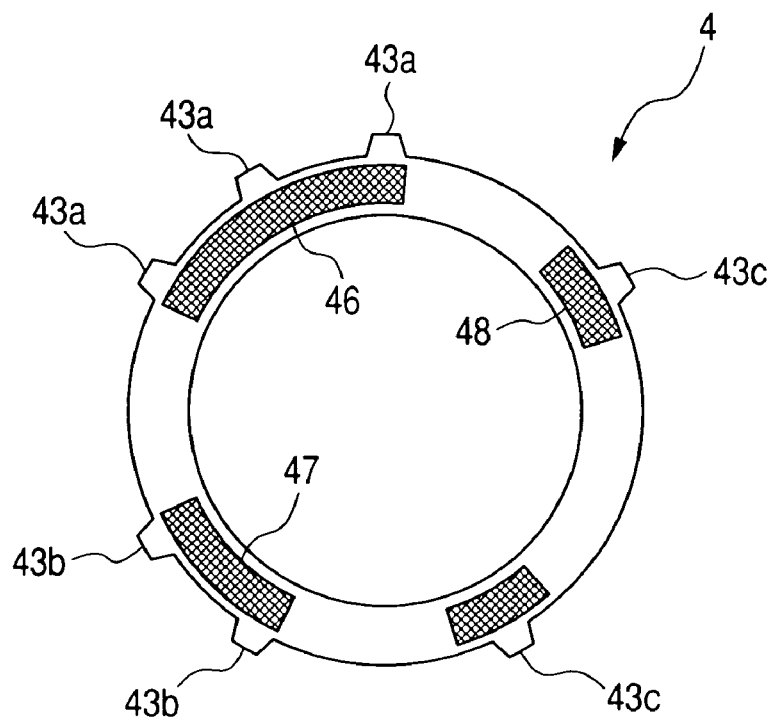
FIG. 3 is a front view of a separator plate used in the multi-plate clutch of the present invention, showing another example of urged areas urged by a piston.

FIG. 1 is an axial sectional view showing an embodiment of a multi-plate clutch 1 according to the present invention, and FIG. 2 is a front view of a separator plate used in the multi-plate clutch of the present invention, showing urged areas urged by a piston. Further, FIG. 3 is a front view of a separator plate used in the multi-plate clutch of the present invention, showing another example of urged areas urged by a piston.

In the multi-plate clutch 1, a clutch case 2 and a hub (not shown) are arranged on a common axis. A spline 6 is formed in an inner peripheral surface of an outer cylindrical portion 21 of the clutch case 2 and driven plates or substantially annular separator plates 4 as friction engaging elements are received in the spline 6, and drive plates or substantially annular friction plates 5 as friction engaging elements are received in a spline formed in an outer periphery of the hub (not shown) in such a manner that the separator plates and the friction plates are alternately arranged on a common axis. Friction materials 38 are secured to both surfaces of each friction plate 5.

Within an axial open end portion of the clutch case 2, there is disposed a backing plate 8 having an axial thickness greater than that of the separator plate 4. By means of a stop ring 18, these friction engaging elements are prevented from dislodging from the clutch case and axial movements of the friction engaging elements are regulated.

On the other hand, within an axial closed end portion of the clutch case 2, there is disposed a piston 30. When oil pressure is supplied into an oil chamber 13 defined between the piston and an inner wall of the clutch case 2, the piston 30 is shifted to the right in FIG. 1 to closely tighten or engage the separator plates 4 and the friction plates 5 with each other through a wave spring 35 provided on a surface of the piston adjacent to the separator plate 4. Oil for the oil pressure is supplied to the oil chamber 13 through an oil port 25 formed in an inner diameter cylindrical portion of the clutch housing or case 2.

In order to prevent oil leakage, i.e. in order to maintain the oil chamber 13 in an oil-tight condition, a seal ring 33 is provided between the piston 30 and the clutch housing 2 and a seal 16 is provided in the inner cylindrical portion 22 of the clutch case 2. Further, when the oil pressure is released from the oil chamber 13, the piston 30 is pushed back by a repelling force of a return spring 14, thereby releasing or disengaging the friction engaging elements. The return spring 14 is supported by a snap ring 19 through a canceller 11 fitted in the piston 30 with the interposition of an O-ring 39. The other end of the return spring 14 is held by the piston 30 through a spring holder 28.

While an example that the piston 30 applies an urging force to the separator plate 4 through the wave spring 35 was explained, the piston may urge the separator plate 4 directly without the wave spring 35.

A plurality of urging portions 41 protruding toward the separator plate 4 and arranged along a circumferential direction are provided on an urging surface 40 of the piston 30. The urging portions 41 are positioned in correspondence to an arrangement of spline projections 43 (refer to FIGS. 2 and 3) provided on an outer periphery of the separator plate 4 un-equidistantly along the circumferential direction.

Now, a relationship between the piston 30 and the separator plate 4 will be explained with reference to FIGS. 2 and 3). As shown, the plural spline projections 43 are provided on the outer periphery of the substantially annular separator plate 4. Respective distances between the adjacent spline projections 43 are not equal, and, thus, the spline projections are arranged un-equidistantly. In FIG. 2, urged areas 45 on the separator plate 4 against which the urging portions 41 of the piston 30 urge the separator plate are positioned in correspondence to positions of the spline projections 43; that is to say, each urged area 45 is substantially opposed to the respective spline projection. Further, a circumferential width of the urged area 45 can suppress a heat spot which may be generated by a difference in stress caused by arranging the spline projections 43 in this way.

FIG. 3 shows another example of urged areas urged by the piston 30. In this example, urged areas 45 urged by the piston 30 are interconnected at least partially. More specifically, unlike to FIG. 2, an urged areas corresponding to three spline projections 43a arranged equidistantly are not provided separately regarding three spline projections but are interconnected to form a single urged area 46. That is to say, the urged area 46 extends continuously in the circumferential direction from a left end of the leftmost spline projection 43a to a right end of the rightmost spline projection 43a.

Further, unlike to FIG. 2, an urged area 48 corresponding to a spline projection 43c solely provided has a length greater than a circumferential width of the spline projection 43c and extends beyond the spline projection in the circumferential direction. The urged areas may be obtained by combining the urged areas shown in FIG. 2 and the urged areas shown in FIG. 3. For example, in FIG. 3, the urged area 46 may be formed as independent urged areas corresponding to the respective spline projections 43a as shown in FIG. 2.

In order to ensure positive correspondence of the urging portions 41 of the piston 30 to the positions of the spline projections 43, 43a, 43b and 43c of the separator plate 4, i.e. in order to align the phase of the piston with the phase of the separator plate, it is preferable to provide rotation preventing means (not shown) on the piston 30. For example, the relative rotation can be prevented by providing spline connection between the inner diameter cylindrical portion 22 of the clutch case 2 and the piston 30.

The present invention can be applied to both of the multi-plate clutch of wet type and the multi-plate cultch of dry type. Further, in the present invention, a friction plate in which the friction material is fixed to only one surface of the friction plate can be used. In addition, the arrangement of the spline projections on the separator plate is not limited to those shown in the drawings, but, other arrangements can be adopted so long as the spline projections are arranged un-equidistantly along the circumferential direction.

This application claims priority from Japanese Patent Application No. 2005-063586 filed on Mar. 8, 2005, which is hereby incorporated by reference herein.

What is claimed is:

1. A multi-plate clutch comprising drive plates which are coaxially disposed within a clutch housing and to which friction materials are fixed, driven plates which are alternately arranged with said drive plates and a piston having an urging surface for providing an axial load to engage said drive plates and said driven plates with each other, wherein
a plurality of urging portions protruding toward said driven plate are formed on said urging surface of said piston and said urging portions are provided in correspondence to an arrangement of spline projections provided on an outer periphery of said driven plate un-equidistantly along a circumferential direction.

2. A multi-plate clutch according to claim 1, wherein at least some of said urging portions of said piston are interconnected to each other.

3. A multi-plate clutch according to claim 1, wherein said piston urges said driven plate through a pressure plate.

4. A multi-plate clutch according to claim 2, wherein said piston urges said driven plate through a pressure plate.

* * * * *